United States Patent
Boehmke et al.

[11] B 3,925,405
[45] Dec. 9, 1975

[54] TRIAZOLE-COUMARINS

[75] Inventors: Günther Boehmke; Hans Theidel, both of Leverkusen, Germany

[73] Assignee: Bayer Aktiengesellschaft, Leverkusen-Bayerwerk, Germany

[22] Filed: Oct. 15, 1971

[21] Appl. No.: 189,773

[44] Published under the Trial Voluntary Protest Program on January 28, 1975 as document no. B 189,773.

[30] Foreign Application Priority Data
Oct. 15, 1970 Germany............................ 2050726

[52] U.S. Cl. ..... 260/308 R; 260/308 A; 260/295 F; 260/309; 260/310 R; 260/343.2 R; 260/307 D; 260/309.2; 260/304; 260/307 R; 260/248 CS; 260/302 H; 260/294.8 C; 252/301.2 W; 8/1 W

[51] Int. Cl.² ............... C07D 249/06; C07D 249/08

[58] Field of Search ..................... 260/308 R, 308 A

[56] References Cited
UNITED STATES PATENTS
3,663,560   5/1972   Schellhammen ................ 260/308 R

*Primary Examiner*—John M. Ford
*Attorney, Agent, or Firm*—Plumley & Tyner

[57] ABSTRACT

Coumarine compounds of the formula

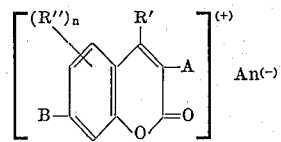

in which
A denotes a carbocyclic aryl radical or a radical of the formula

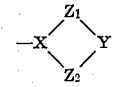

in which
X represents —CH— or N and
Y represents

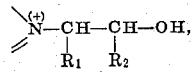

wherein
the radicals $R_1$, $R_2$, $Z_1$, $Z_2$, B, R', R'', An⁻ and n have the same meaning as in the description, with the proviso that at least one of the radicals A and B represents a heterocyclic radical

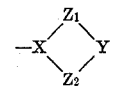

as well as their preparation and their use as optical brighteners.

5 Claims, No Drawings

TRIAZOLE-COUMARINS

The subject of the present invention are coumarine compounds of the formula

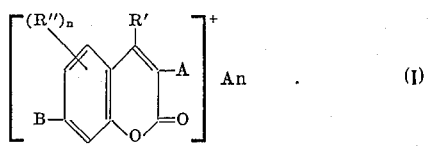

in which
A denotes a carbocyclic aryl radical or a radical of the formula

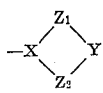

in which
X represents —CH— or N and
Y represents

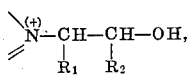

wherein
R$_1$ and R$_2$ denote hydrogen, alkyl or aryl radicals and Z$_1$ and Z$_2$ represent the remaining members of an aromatic 5-membered or 6-membered heterocyclic structure,
B represents hydrogen, halogen, an identical or different radical A, or an alkyl, acylamino, etherified hydroxyl, nitrile, optionally modified carboxyl or sulphonamide group,
R' denotes hydrogen or alkyl,
R'' denotes a non-ionic substituent and
An$^\ominus$ denotes a colourless anion, and
n represents a number from 0 to 2,
with the proviso that at least one of the radicals A and B represents a heterocyclic radical

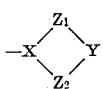

as well as their manufacture and use as optical brighteners or dyestuffs.

Suitable carbocyclic aryl radicals A and B are especially phenyl and naphthyl radicals which optionally contain further non-ionic substituents.

Possible radicals of an aromatic 5-membered or 6-membered heterocyclic structure which A and/or B can represent are, for example, 1,2,3-triazolyl-1, 1,2,4-triazolyl-1, pyrazolyl, imidazolyl, benzoxazolyl-2, benzimidazolyl-2, benzthiazolyl-2, oxazolyl-2, thiazolyl-2, triazinyl and 2,3- or 4-pyridyl radicals which contain at least one quaternised ring nitrogen atom linked to the radical

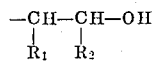

wherein
R$_1$ and R$_2$ preferably represent lower alkyl radicals with 1 – 4 C atoms, which are optionally substituted, for example by halogen, nitrile, alkoxy or phenoxy groups, or phenyl radicals which are optionally substituted, for example by fluorine, chlorine, bromine, C$_1$–C$_4$-alkyl or C$_1$–C$_4$ alkoxy.

The alkyl radicals B and R' are also preferably C$_1$–C$_4$-alkyl radicals.

Suitable acylamino groups A are to be understood as alkylcarbonylamino, alkoxycarbonylamino, phenylcarbonylamino, alkylsulphonylamino, phenylsulphonylamino, alkylaminocarbonylamino and phenylaminocarbonylamino groups, with the alkyl and alkoxy radicals preferably possessing 1 – 4 C atoms and the phenyl radicals being able to carry further non-ionic substituents.

By etherified hydroxyl groups A there are especially to be understood C$_1$–C$_4$-alkoxy, optionally substituted phenoxy and benzyloxy radicals.

Possible modified carboxyl groups A are carboxylic acid ester and carboxylic acid amide groups.

Within the scope of the present invention, non-ionic substituents are to be understood as substituents which are customary in the chemistry of brighteners, such as halogen atoms or alkyl, aryl, alkoxy, aryloxy, nitrile, carboxyl, carboxylic acid ester, carboxylic acid amide, sulphonamide, alkylsulphonyl and arylsulphonyl groups.

By the anion An$^\ominus$ there are to be understood both organic and inorganic ions, for example halogen, such as chloride, bromide or iodide, or hydroxide, carbonate, bicarbonate, alkylsulphate, sulphate, disulphate, perchlorate, phosphate, benzenesulphonate or naphthalenesulphonate, 4-chlorobenzenesulphonate, oxalate, acetate, maleinate, propionate, methanesulphonate, chloroacetate, lactate, tartrate, glycerate, citrate or benzoate ions or complex anions, such as, for example, anions of zinc chloride double salts. At the same time, the formate ion and above all the acetate ion are to be regarded as particularly suitable.

Preferred compounds within the scope of the formula are those of the formula

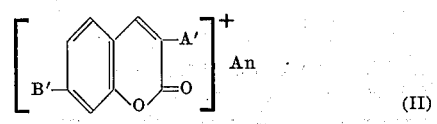

in which
An$^\ominus$ has the abovementioned meaning,
A' represents

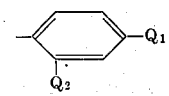

wherein
Q$_1$ and Q$_2$ can represent hydrogen, fluorine, chlorine, bromine, C$_1$–C$_4$-alkyl, C$_1$–C$_4$-alkoxy and phenyl, or
A' represents a heterocyclic radical

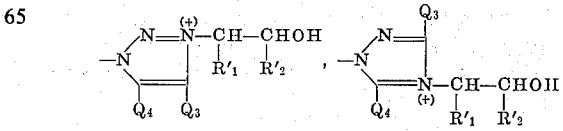

or

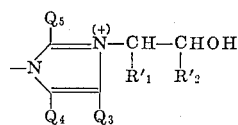

wherein
R′$_1$ and R′$_2$ denote hydrogen or a C$_1$–C$_4$-alkyl or phenyl radical, and
Q$_3$, Q$_4$ and Q$_5$ denote hydrogen, chlorine, a C$_1$–C$_4$-alkyl, phenyl, nitrile, carboxyl, carbonamide or carboxylic acid ester radical, and
B′ represents C$_1$–C$_4$-alkoxy or an identical or different radical A′, with the proviso that at least one radical A′ and B′ represents one of the abovementioned heterocyclic radicals.

The new coumarine compounds of the formula I are obtained if compounds of the formula

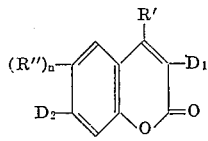

in which
D$_1$ represents a carbocyclic aryl radical having the abovementioned meaning, or the radical of an aromatic 5-membered or 6-membered heterocyclic structure of the formula

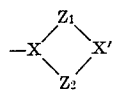

wherein
X, Z$_1$ and Z$_2$ have the abovementioned meaning and X′ represents a tertiary ring nitrogen atom,
D$_2$ represents hydrogen, an identical or different radical D$_1$, or halogen or an alkyl, an acylamino, an etherified hydroxyl, a nitrile, an optionally modified carboxyl or a sulphonamide group and
R′, R″ and $n$ have the abovementioned meaning, are reacted, preferably in the presence of acids, that is to say quaternised, with compounds of the formula

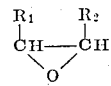

in which
R$_1$ and R$_2$ have the abovementioned meaning.

Possible starting materials for this quaternisation are preferably those coumarine compounds of the general formula III which are described in the following Patent Specifications:

U.S. Patent Specification 3,251,851 (3-phenyl-7-(1,2,3-triazolyl-2)-coumarines)
French Patent Specification 1,551,662 (3-phenyl-7-(1,2,4-triazolyl-1)-coumarines)
U.S. Patent Specification 3,123,617 (3-phenyl-7-pyrazolyl-1)-coumarines
British Patent Specification 867,592 (3-C-hetaryl-coumarines)
British Patent Specification 914,719 (3-(benzoxazolyl-2)-coumarines)
U.S. Patent Specifications 3,156,697 and 3,201,406 (3-pyridyl-coumarines)
U.S. Patent Specifications 3,014,041 and 3,458,880 (3-C-hetarylcoumarines)
U.S. Patent Specification 3,271,412 (3-N-hetarylcoumarines)
French Patent Specification 1,567,497 (3-(1,2,4-triazolyl-1)-7-pyrazolyl-coumarines)
German Published Application (DOS) 1,670,999 (3-(1,2,4-triazolyl-1)-7-(1,2,3-triazolyl-2)-coumarines)
German Published Application (DOS) 1,770,182 (3-aryl-7-triazinyl-coumarines)
French Patent Specification 1,498,700 (3-aryl-7-benzazolyl-2-coumarines
German Published Application (DOS) 1,906,662 (3-hetaryl-7-(1,2,3-triazolyl-2)-coumarine-N-oxides)
German Published Application (DOS) 1,919,181 (3-(1,2,4-triazolyl-1)-7-aryl-triazolyl-coumarines)
German Published Application (DOS) 2,037,854 (3-chloropyrazolyl-7-(1,2,3-triazolyl-2)-coumarines)

Suitable quaternising agents of the formula IV are those described in Houben-Weyl, Methoden der Org. Chem. (Methods of Organic Chemistry), volume VI/3, page 367 and thereafter. As examples, there may be mentioned: ethylene oxide, 1,2-propylene oxide, 1,2-butylene oxide, glycid, styrene oxide, phenyl-glycidyl-ether and epichlorohydrin.

The reaction, according to the invention, of III with IV preferably takes place in lower fatty acids, such as formic acid, acetic acid and propionic acid, as the reaction media.

In those cases in which the ring nitrogen atom to be quaternised has a relatively high basicity, as is, for example, the case with pyridine, the process can also be carried out in an aqueous or aqueous-organic medium.

Suitable organic solvents are: methanol, ethanol, isopropanol, butanol, acetone, methyl ethyl ketone, glycol, propylene glycol, methyl-, ethyl- and butyl-glycol-ether, formic acid methyl ester, glycerol monoacetate, formamide, dimethylformamide, dimethyl-sulphoxide and methylpyrrolidone.

When carrying out the process in aqueous and aqueous-organic media it is advisable to maintain the pH value of the reaction mixture, which can rise as far as 13 through formation of the quaternary base, at 7–9 by continuous addition of acid.

Suitable acids are, for example, mineral acids, arylsulphonic acids and lower monobasic and dibasic aliphatic carboxylic acids.

The following acids may be mentioned as examples: hydrochloric acid, hydrobromic acid, sulphuric acid, phosphoric acid, benzenesulphonic and toluenesulphonic acid, benzenecarboxylic and toluenecarboxylic acid, p-hydroxybenzoic and o-hydroxybenzoic acid, formic acid, acetic acid, propionic acid, lactic acid, malic acid, tartaric acid, citric acid and others.

The reaction temperatures can be varied over a substantial range.

In general the process is carried out at 0° to 80°C, preferably 10° to 50°C.

The molar ratios of the reactants can also be varied widely.

In carrying out the reaction according to the invention in an aqueous or aqueous-organic medium, the reactants III and IV are in general employed in the ratio of 1:1, but an excess of IV normally does not influence the desired course of the reaction.

When working in pure lower fatty acids it is, on the other hand, advisable to use a 2-fold to 5-fold excess of IV.

The new coumarine compounds of the formula I barely retain any tendency to crystallise and are almost infinitely soluble in water as well as in polar organic solvents. They are therefore much more suitable than the nearest comparable quaternary coumarine bases, known from the abovementioned Patent Specifications, for the manufacture of concentrated, stable liquid compositions, such as are required, say, for automatically controlled processes for the treatment of fibres and fabrics.

In contrast to the conventional methods for the manufacture of concentrated liquid compositions of optical brighteners, which are characterised by the use of special solvents for the types of brighteners already known as powder products, the process according to the invention for the manufacture of liquid compositions is characterised by lesser technical effort and hence by a considerable saving in cost.

Furthermore, the use of solvents, solubilising agents and other auxiliaries frequently presents greater difficulties in the case of brighteners than, for example, in the case of dyestuffs, since in the case of brighteners it can result in very severe colour shade distortions (for example development of a green tone), reduction in fluorescence and even, for example if molecular adducts are formed, quenching of the fluorescence.

Finally, in the present case another conventional process for the manufacture of concentrated brightener solutions, which is characterised by the use of special counter-ions - for example acetate ions instead of the otherwise customary halide ions and sulphate ions — is completely unsuitable, since this ion exchange takes place via the bases liberated by addition of alkali, in the course of which the sensitive lactone ring of the coumarines would be split open.

EXAMPLE 1

30 g of the 3,7-heteryl-coumarine derivative of the following formula

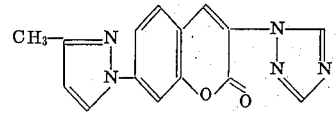

(according to French Pat. Specification No. 1,567,497) are dissolved in 70 g of formic acid and 20 g of benzene at 50°C. Ethylene oxide is then passed in for about 3 – 4 hours. 3 – 5 times the theoretical absorption of ethylene oxide is necessary until a sample freed of benzene gives a clear solution in water. Thereafter the benzene, and the greater part of the formic acid, are distilled from the entire batch in vacuo. The residue consists of the brightener of the structure given below and of formic acid glycol ester, and these can be taken up in water to give a 20 – 30% strength solution:

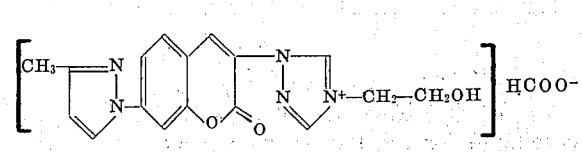

EXAMPLE 2

10 g of the 3,7-di-triazolyl-coumarine derivative according to German Published Application No. (DOS) 1,670,999

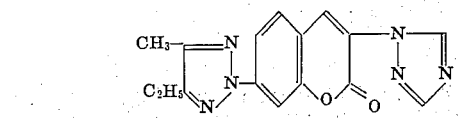

are dissolved in 15 g of formic acid and 50 g of chlorobenzene by warming. Ethylene oxide is then slowly passed in at 20°C. The solution, which initially turns cloudy, becomes clear after 6 – 8 hours. Small amounts of dissolved ethylene oxide, excess formic acid and the chlorobenzene are distilled off in vacuo. The chlorobenzene is totally removed by means of a vacuum steam distillation. A 10–40% strength solution, depending on requirements, can then be prepared with water. The compound which has been quaternised with dimethyl sulphate does not even permit a 10% strength aqueous solution to be prepared.

Further coumarine derivatives, as described in the Patent Specifications mentioned on pages 6+7, can also be converted into stable, aqueous solutions in accordance with the process of the invention:

Coumarine derivatives

| 7-position | 3-position | Anion |
|---|---|---|
| CH₃ pyrazolyl (N-N) | triazolyl-N⁺—CH₂—CH₂OH | HCOO⁻ |
| CH₃, C₂H₅ pyrazolyl | Same as above | HCOO⁻ |
| CH₃ pyrazolyl | do. | HCOO⁻ |

| 7-position | 3-position | Anion |
|---|---|---|
| CH₃ pyrazole (dimethyl) | ...do... | HCOO⁻ |
| phenyl-pyrazole | ...do... | HCOO⁻ |
| phenyl-methyl-pyrazole | ...do... | HCOO⁻ |
| HOCH₂CH₂—N⁺ triazole | phenyl | CH₃—CH(OH)—COO⁻ |
| Same as above | —C₆H₄—CH₃ | Same as above. |
| Do. | —C₆H₄—OCH₃ | Do. |

EXAMPLE 3

40 g of the coumarine derivative of the formula (according to German Published Application No. (DOS) 1,670,999

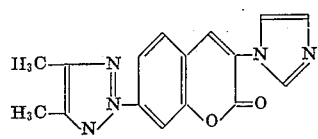

are dissolved in 80 g of acetic acid and 80 g of acetic acid methyl ester at 40°–50° C. 18 g of phenyl-glycidyl-ether (3-phenoxy-propylene oxide) are added dropwise over the course of 3 – 4 hours and the mixture is thereafter stirred for a further 3 hours. The acetic acid methyl ester is then distilled off. The acetic acid solution, which is of approx. 45% strength, can be employed for brightening polyacrylonitrile material, or alternatively the acetic acid can be largely removed in vacuo and the residue adjusted with water to the desired concentration, for example 30% strength.

The brightener has the following structure:

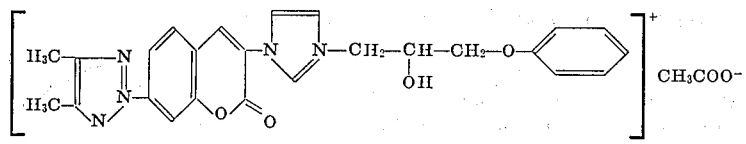

We claim:
1. Coumarine compound of the formula:

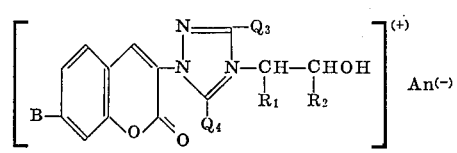

wherein
$R_1$ and $R_2$, independently of each other, are hydrogen, $C_1$–$C_4$-alkyl, or phenyl;
$Q_3$ and $Q_4$, independently of each other, are hydrogen, chloro, $C_1$–$C_4$-alkyl, phenyl, cyano, carboxyl, or carbonamido;
B is $C_1$–$C_4$-alkoxy,

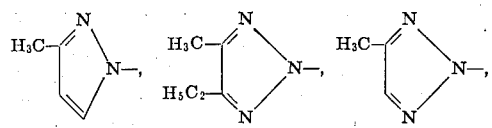

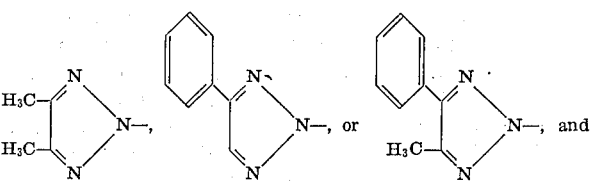

An⊖ is chloride, bromide, iodide, hydroxide, carbonate, bicarbonate, alkylsulphate, sulphate, disulphate, perchlorate, phosphate, benzenesulphonate, naphthalenesulphonate, 4-chlorobenzenesulphonate, oxalate, acetate, maleinate, propionate, methanesulphonate, chloroacetate, lactate, tartrate, glycerate, citrate, benzoate, formate or the anion of zinc chloride double salts.

2. The compound of claim 1 wherein An⊖ is formate.
3. The compound of claim 1 wherein An⊖ is acetate.

4. The coumarine compound of claim 1 of the formula
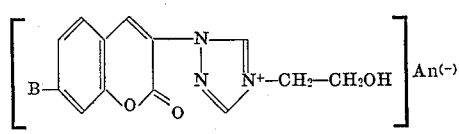
wherein B is
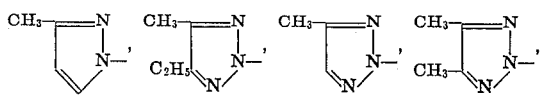
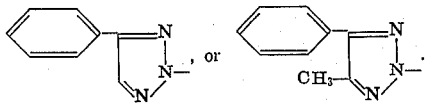
5. The coumarine compound of claim 1 of the formula
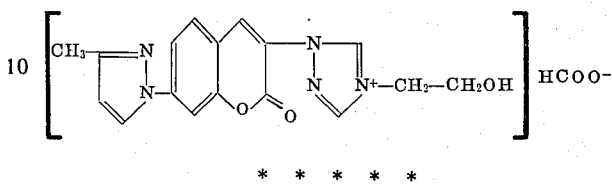
* * * * *